No. 807,804. PATENTED DEC. 19, 1905.
C. L. BETZ.
GLASS MELTING POT.
APPLICATION FILED MAY 27, 1905.
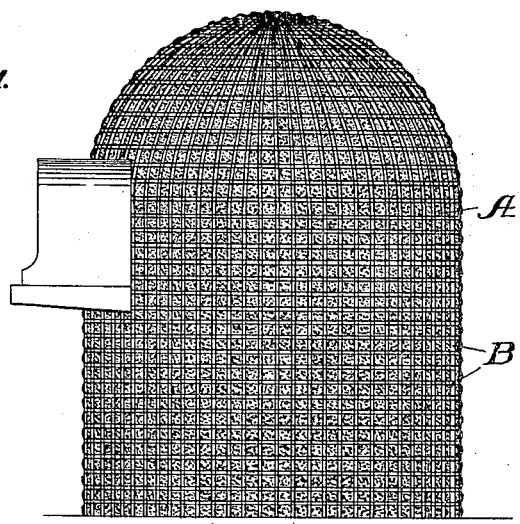
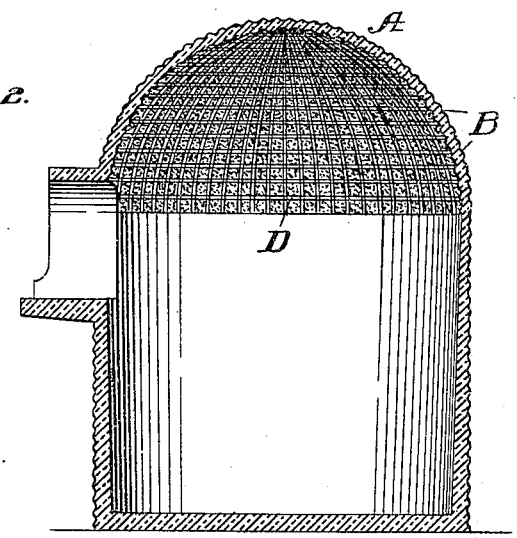
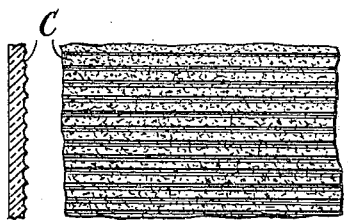

UNITED STATES PATENT OFFICE.

CHARLES L. BETZ, OF ROCHESTER, PENNSYLVANIA.

GLASS-MELTING POT.

No. 807,804.      Specification of Letters Patent.      Patented Dec. 19, 1905.

Application filed May 27, 1905. Serial No. 262,572.

*To all whom it may concern:*

Be it known that I, CHARLES L. BETZ, a citizen of the United States, residing at Rochester, in the county of Beaver and State of Pennsylvania, have invented certain new and useful Improvements in Glass-Melting Pots, of which the following is a specification, reference being had therein to the accompanying drawings.

Glass-melting pots commonly used in glass factories are closed, save for the working opening in each, usually in the form of a protruding mouth or neck which extends through and is sealed in the outer wall of the furnace, whereby the furnace-inclosed pots are accessible to the glass-workers. The batch is melted and the glass maintained in working condition wholly by heat radiated through the walls of the pots.

The pots are formed or molded of clay, and the universal practice is and always has been to make their inner and outer walls smooth. While such formation is necessary to minimize the destructive wear to which those portions of the inner walls in contact with the batch or molten glass are subject, the smooth outer surfaces are a detriment, as they tend to reflect or throw off the heat, and thus resist and retard its absorption. While this is the tendency regardless of the form or construction of the pot-inclosing furnace, it is more pronounced in these types wherein the heat is maintained by a blast or in strong currents. In such furnaces the smooth surfaces of the pots tend to deflect the heat, hence absorbing it much more slowly than though the surfaces were of such formation as to confine, retard, or pocket the heat and facilitate its radiation through the pot-walls. It is therefore the purpose of the present invention to so form the pots by making rough or irregular the outer surfaces thereof that they and the batch contained therein will heat up much more quickly than heretofore and be more easily maintained at the required temperature while the batch is being melted and the glass worked out.

A further purpose is to similarly roughen or make irregular that part of the inner surface of the pot above the glass-level, thereby further facilitating radiation of the heat.

In the accompanying drawings, Figure 1 is a side elevation of a pot of ordinary shape, showing its outer surface roughened or made irregular in accordance with my invention; and Fig. 2 is a vertical sectional view of the same. Fig. 3 illustrates a different form of surface irregularity.

When forming or molding the clay pot, its outer surface may be variously indented and roughened before the clay hardens or becomes set. A desirable formation is shown in Figs. 1 and 2, wherein the outer surface A is checked or indented by cross-grooves B, or the surface may be roughened or corrugated by grooves extending in one direction only, as at C, Fig. 3. In fact, the form or shape of the irregularities is only incidental to the underlying purpose or object, which is to do away with the heretofore smooth surface by so indenting or roughening the same as to confine or pocket the enveloping heat, and thereby accelerate its absorption and radiation by the pot-walls.

The heating up of the pot interior may be further facilitated by roughening the interior surface thereof above the glass-level, as indicated at D, although such formation need not necessarily accompany the roughened exterior and may, if preferred, be omitted.

The obvious advantages of the invention are that with the roughened surface a pot and its contents may be heated more quickly than heretofore and the requisite heat more readily maintained, thereby facilitating the melting operation, economizing fuel, and increasing the life of the pot by decreasing its period of service for each heat.

While the invention relates, primarily, to glass-melting clay pots, it may be applied to crucibles of various kinds regardless of the use for which they are intended or the material of which they are formed.

I claim—

1. A glass-melting clay pot having a rough or irregular outer surface, for the purpose described.

2. A melting-pot or crucible having its inner surface rough or irregular above the level of its contents, for the purpose described.

3. A glass-melting clay pot having its outer surface rough or irregular, and its inner surface rough or irregular above the glass-level and smooth below the same.

In testimony whereof I affix my signature in presence of two witnesses.

CHARLES L. BETZ.

Witnesses:
     NELSON S. OTTO,
     GEORGE GOODMAN.